June 24, 1952 — K. W. McLOAD — 2,601,543
DOUBLE COIL CABLE GEOPHONE
Filed Sept. 12, 1949 — 2 SHEETS—SHEET 1

KENNETH W. McLOAD
INVENTOR.

BY D. Carl Richards
AGENT

June 24, 1952  K. W. McLOAD  2,601,543
DOUBLE COIL CABLE GEOPHONE
Filed Sept. 12, 1949  2 SHEETS—SHEET 2
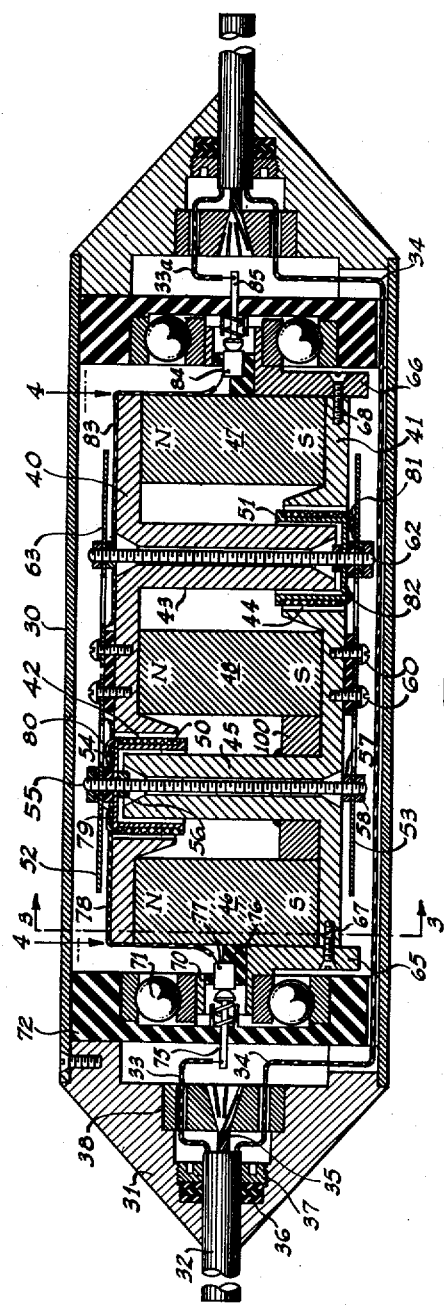
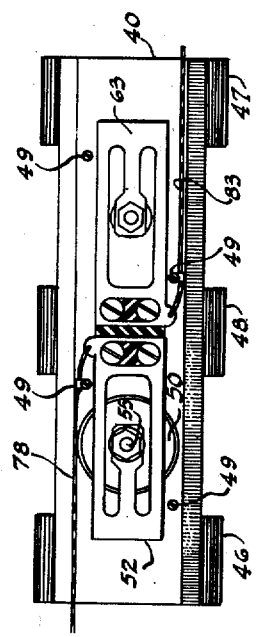
KENNETH W. McLOAD
INVENTOR.
BY D. Cail Richards
AGENT Patented June 24, 1952

2,601,543

UNITED STATES PATENT OFFICE 2,601,543

DOUBLE COIL CABLE GEOPHONE

Kenneth W. McLoad, Dallas, Tex., assignor, by mesne assignments, to Socony-Vacuum Oil Company, Incorporated, New York, N. Y., a corporation of New York Application September 12, 1949, Serial No. 115,293

6 Claims. (Cl. 177—352)

This invention relates to vibration sensitive devices and more particularly to a geophone for a seismic cable which is small, self-orienting, and in operation is free from interference from extraneous magnetic fields.

In many areas it has been found difficult to detect reflected seismic waves in such manner that they may be distinguished from high amplitude random background noises. Such difficulty in many cases appears to be caused by non-conformities in near surface formations particularly in areas where rock formations outcrop. Discontinuities in the surface rock generally make uniform placement of seismic detectors practically impossible, in which case the records of signals detected are much less useful than they otherwise might be. It has been the practice to utilize a great many detectors in such areas in order to suppress by cancellation, signals that appear to be due to random noise energy but which may be attributed to non-uniform geophone locations. Where, in accordance with the general practice, one or two geophones per trace would be used, as many as 60 to 100 geophones per trace have been found to be desirable. Accordingly, as many as 360 individual geophones properly oriented and connected to recording equipment would be required for the recordation of a conventional six trace seismic record.

The present invention is directed to the provision of a detector for seismic surveying apparatus which minimizes the expenditure of time in placing such detector groups or spreads. More particularly, a vertically sensitive self-positioning geophone is provided which may conveniently be included as a part of a seismic cable. Because of self-positioning features, a multiplicity of geophones may be included as an integral part of a seismic cable and may merely be dragged to the selected location whereupon the geophones orient themselves for the reception of seismic waves.

In accordance with the present invention an electromagnetic cable geophone is provided which comprises a magnet structure having symmetrically divided flux paths with each flux path having an air gap. Spring mounted coils are associated with each of the air gaps and are mounted for opposite movement with respect to the flux in the air gaps linking the turns thereof upon vibration of the magnet structure for generation of voltages of opposite polarity. An electrical circuit is provided to connect the coils for subtraction of the generated voltages. The magnet structure is mounted for rotation about the axis of a cable and is gravitationally biased to maintain the magnet structure in a selected position upon rotation of the cable about its axis to insure, for any position, generation of a voltage of known polarity upon application of an impulse in a given direction.

For a more complete understanding of the invention and for further objects and advantages thereof reference may now be had to the following description taken in conjunction with the accompanying drawings in which:

Fig. 2 is a sectional view of the geophone taken through the axis of the cable;

Fig. 4 is a plan view of the geophone structure taken along the line 4—4 of Fig. 2.

Figure 1:
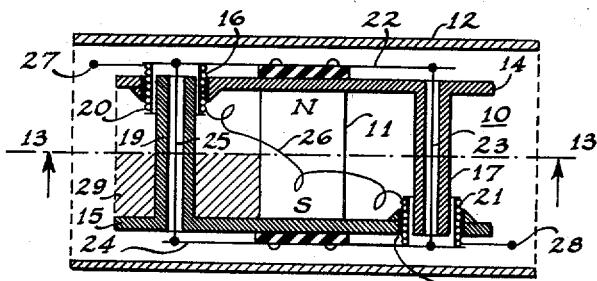
Fig. 1 is a diagrammatic illustration of the present invention.

Referring now to Fig. 1, a detector unit embodying the present invention has been illustrated in diagrammatic form as comprising a magnet structure 10 including a permanent magnet 11 mounted for free rotation within a cylindrical housing 12. The axis of rotation 13—13 is parallel to and preferably coincides with the axis of the cylindrical housing 12 and is perpendicular to the longitudinal axis of the magnet 11. The magnet structure 10 includes symmetrically divided flux paths which include identical pole pieces 14 and 15. Pole piece 14 is an elongated plate having an aperture 16 near one end and a hollow cylindrical extension 17 fastened to the other end and extending at a right angle from the plate portion to the pole piece 15. Similarly, pole piece 15 has an aperture 18 and a hollow cylindrical extension 19. Pole pieces 14 and 15 are maintained in a predetermined spaced apart relation by magnet 11, the spacing being such that the cylinder 17 extends into the aperture 18 and the cylinder 19 extends into aperture 16. It will be noted that there are two magnetic flux paths. A first one may be traced from the north pole N of magnet 11 to aperture 16 thence through an air gap to extension 19 of pole piece 15 and back to the south pole S of magnet 11. The second flux path includes north pole N of magnet 11, pole piece 14, extension 17, an air gap, and pole piece 15 adjacent the south pole S of magnet 11. Apertures 16 and 18 preferably are circular so that the flux threading the two air gaps will be radial.

A coil 20 is positioned in aperture 16 and encircles the end of pole piece 19. Similarly, coil 21 is positioned in aperture 18 and encircles the end of pole piece 17. A spring 22 fastened at one end to coil 20 and to a spacer 23 at the other end is rigidly fastened at its center to plate 14. A similar spring 24 fastened at its center to plate 15 carries coil 21 at one end and a second spacer 25 at the other end. Spacer 23 mechanically couples the right hand ends of springs 22 and 24 and spacer 25 mechanically interconnects the left hand ends of springs 22 and 24 to assure translational vibration of the coils. Upon vibration of housing 12 carrying the magnetic structure 10 with it, the resiliently mounted coils 20 and 21 because of their inertia tend to remain stationary for opposite movement with respect to the flux linking the windings thereof. For an upward movement of the magnet structure, as viewed in Fig. 1, the flux linked by coil 16 will be increased to generate a voltage whose amplitude is proportional to the rate of increase of flux linkages and which, for purposes of the present discussion, may have a polarity assumed to be positive. At the same time, the flux linked by coil 21 tends to decrease, generating a voltage therein of the same magnitude but opposite or negative polarity. The coils 20 and 21 are interconnected by conductor 26 for subtraction of the voltages generated. Since the voltages are of opposite polarity they appear at terminals 27 and 28 to be reinforcing or in phase. Stated quite briefly, the voltages generated in coils 20 and 21 by virtue of variation of the linkage with flux from magnet 11 will have the same shape and magnitude but will be of opposite polarity. By algebraically subtracting the two voltages, the voltage output represents ground movement.

It is often found that undesired signals are produced because of the presence of extraneous magnetic fields. In the geophone of the present invention the flux from extraneous fields would link coils 20 and 21 in the same direction and the variations in those flux linkages produce voltages in the coils simultaneously having the same polarity. Since the coils 20 and 21 are connected for subtraction of the voltages generated due to flux from magnet 11, voltages due to the presence of extraneous fields automatically will be cancelled. Thus, the geophone may be operated in the presence of and unhampered by extraneous fields.

The magnetic structure as above indicated is preferably mounted, as will hereinafter be further explained, for free rotation within the housing 12. A heavy mass 29 of non-magnetic material shown cross-hatched in Fig. 1 may be carried by the lower half of the magnet structure 10 gravitationally to bias the magnet structure so that coils 20 and 21 will be maintained in a predetermined orientation, i. e., coil 20 will always be uppermost. By providing such novel geophone construction as illustrated in Fig. 1 the double-coil geophone may have dimensions sufficiently small to permit its accommodation in a seismic cable without requiring a housing of excessive diameter. At the same time, all of the advantages of double coil geophone operation are retained.

Referring now to Fig. 2, a section of seismic cable including a detector unit has been illustrated in greater detail. The detector unit comprises a housing 30 which is provided with an end member 31 in which the cable 32 is mechanically terminated. The cable 32 includes conductors 33 and 34 and a strain member 35 enclosed within an abrasion-resistant sheath. The end member 31 is cone shaped with the cable 32 entering a channel at the peak of the cone. Rubber gaskets 36 encircling the cable 32 are compressed under a nut 37 to form a liquid seal where the cable 32 enters the housing 30. The strain member 35 is flared and soldered in a cone shaped aperture in the disc 38 to withstand the strain applied to the cable when it is dragged or towed over a surface to be surveyed.

Conductors 33 and 34 pass through channels provided in the disc 38 and one of them, the conductor 34, is threaded along the inner surface of the cylindrical housing 30 and thence to succeeding sections of the cable and other detector units. The conductor 33 is connected to the coils of the detector as will later be explained. Within the housing 30 there is located a detector of the double coil type which, as above described, is self-positioning, thus permitting the housing 30 to assume any angular position with respect to its horizontal axis without regard to the position of the magnetic structure of the geophone.

The geophone in a preferred form comprises two plates 40 and 41. Plate 40 has an aperture 42 near one end thereof and a pole piece 43 extending perpendicularly from plate 40 at a point near the other end thereof. Similarly, plate 41 has an aperture 44 and a pole piece 45. In this modification three bar magnets are utilized which increases the flux density in the apertures over that of the modification illustrated in Fig. 1 and consequently increases the geophone sensitivity. Bar magnets 46 and 47 are positioned adjacent the ends of the plates 40 and 41. A third bar magnet 48 is positioned at the center of the plates. With the magnets 46—48 similarly poled with respect to the plates, a radial magnetic flux is produced between the end of pole piece 45 and the plate 40, and between the end of the pole piece 43 and the plate 41.

As illustrated in Fig. 4, screws 49 (omitted from Figs. 1 and 2 for the purpose of simplicity) may be utilized to fasten the plates and the associated magnets rigidly together. The screws 49 passing through the plate 40 may threadedly engage plate 41 to lend rigidity to the system, in addition to the force of attraction exerted by the magnets on the pole pieces 40 and 41.

Two coils 50 and 51 are positioned adjacent the ends of pole pieces 45 and 43 respectively. A plurality of turns of wire wound upon a cup-shaped coil form encircle the ends of the pole pieces. Coil 50 encircling pole piece 45 is resiliently supported by a spring 52 which is supported by and insulated from plate 40, and also supported by a second spring 53 electrically insulated from and supported by plate 41. A spacer bolt 55 passes through spring 52 through an insulating washer 54 thence through the metallic cup of coil 50 and through the channel in the pole piece 45. A nut 56 threaded on the screw 55 maintains a rigid coupling between coil 50 and spring 52. Similarly, spring 53 is rigidly coupled to the end of screw 55 between nuts 57 and 58. Thus mounted, coil 50 is free to vibrate along the axis of aperture 42 upon reception of a seismic impulse.

A similar arrangement is provided for mounting coil 51 in the aperture 44 of plate 41. The spring 53 secured at its center under screws 60 serves to support both coils 50 and 51. A spacer bolt 62 coupled to coil 51 extends through pole piece 43 and is coupled to a spring 63. As illustrated in Fig. 4, the spring 52 is insulated from spring 63 in order to provide, as will hereinafter be explained, an insulated electrical path through the springs to the winding of each of coils 50 and 51.

Figure 3:
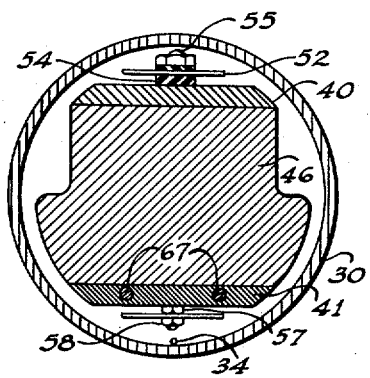
Fig. 3 is a cross-section taken along the line 3—3 of Fig. 2.

The geophone is mounted within a housing 30 by means of supports 65 and 66 which are fastened to opposite ends of plate 41 by means including screws 67 and 68. The support 65 has a hollow, cylindrical extension 70 carried by the inner-race of a ball bearing 71. The ball bearing 71 is mounted in a disc of insulating material 72 which is fastened in the end of the housing 30. With a similar structure in the right-hand end of the geophone as viewed in Fig. 2, the geophone is mounted for free rotation within and about the axis of the housing. As illustrated in Fig. 3, the magnet 46 is not symmetrical with respect to the axis and, because of the excessive weight below the axis, is gravitationally biased so that the plate 40 will always remain uppermost irrespective of the angular rotation of the housing 30.

There will now be explained one manner of providing an electrical circuit from the cable sections at each end of a housing to the rotatably mounted coils. The conductor 33 from cable 35 is connected to a spring biased plunger 75 carried by the insulating disc 72. The symmetrical shaft extension 70 has an insulating block 76 pressed therein which carries a butt contact 77. The butt contact 77 and the spring biased plunger 75 are located at the axis of rotation and thus provide an insulated conducting path through the rotational mounting to the coils 50 and 51. In the form illustrated, a conductor 78 extends from the butt contact 77 to the spring 52. The electrical circuit then is comprised of the spring 52, conductor 79, coil 50, and conductor 80 which connects one terminal of the coil 50 to its metallic coil form. Since the nut 56 metallically engages the coil form, the electrical circuit is completed to the screw 55 and spring 53 and from spring 53 by way of conductor 81 to coil 51. Conductor 82 connects the other terminal of coil 51 to its metallic coil form. The circuit is then completed through the screw 62 to the spring 63 and thence by way of conductor 83 to butt contact 84 at the opposite end of the housing. The spring biased contact 85 engages butt contact 84 at the right hand end of the housing and is connected to conductor 33a. Thus the coils 50 and 51 are connected in series opposition to combine voltages generated therein. The detector then is connected by conductors 33a and 34 to other geophones included in the cable. Thus the springs 52 and 53 and 63 and the spacers 55 and 62 serve as a portion of the electrical circuit. In each cable having a plurality of units such as illustrated in Fig. 2, one of the conductors includes elements 52, 53, 63, 55, and 62 in series with the two coils 50 and 51 so that only one conductor (the conductor 34) needs separately to be channeled through each geophone unit. Thus all the coils of all the geophones in a given cable may be connected in series.

Figure 5:
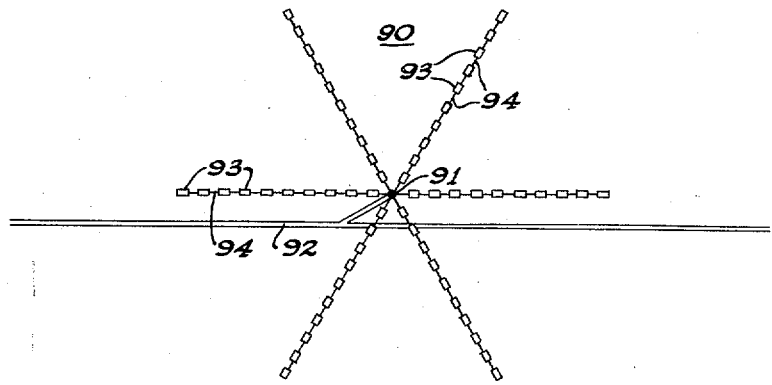
Fig. 5 is a schematic view of a plurality of seismic detector units in a blanket spread.

By using a plurality of geophone units in a seismic cable, a sufficient number of signals may be detected and mixed that noise waves will be substantially cancelled, making possible the identification of reflected waves above the noise. In many areas such as on the Edwards Plateau in west Texas where a thick limestone section is found at the surface over a substantial portion of the area, it has been found desirable, and in many cases necessary, to use a plurality of detectors connected to each amplifier-recording channel if seismic records of any real value are to be obtained. The present invention is particularly suited for such operation. One manner of employing the detector-cable construction of Fig. 2 has been illustrated in Fig. 5 which includes a cable array 90. At the detector station there are provided six lengths of geophone cable connected at a common point 91 to a trunk line 92. Each of the seismic cables includes geophones 93 connected in series and interconnected by cable sections 94. As illustrated, there are 10 geophones in each cable. The six cables are positioned in a symmetrical array extending as radial lines from the center point 91 where they are connected preferably in parallel. Of course, other configurations might be used to advantage since it is desired to detect and combine a plurality of signals at each location. By using the array 90 illustrated in Fig. 5, coverage of a substantial area is afforded. It is to be understood that similar arrays may be used for as many additional amplifying-recording channels as are desired or as are available. By constructing geophones of the present invention to form an integral part of the seismic cable, each of the cables containing a number of geophones may be merely dragged to a selected location and plugged or connected into a trunk cable. The geophones themselves automatically are oriented for detection of seismic waves, their combined outputs providing an integrated function of the ground movement over the area blanketed by an array at the selected detecting station.

It will be apparent that modifications in the geophone above described and illustrated may be made without changing the fundamentals of operation. For example, pole pieces 43 and 45 could be interchanged with suitably shaped magnets. However, since the pole pieces 43 and 45 may be cast as integral parts of the associated plates, the form illustrated in Fig. 2 is preferred.

A ring of non-magnetic material 100, Fig. 2, is fitted over the pole piece 45 to increase the gravitational bias provided by the non-symmetry of the magnets and by the supports 65 and 66. It will be apparent that other means may be used to provide the gravitational bias. In any case, however, it is desirable from the standpoint of sensitivity to have as much of the geophone space as possible occupied by permanent magnet material in order to produce a high flux density in the air gaps associated with the geophone coils.

While specific embodiments of the present invention have been described, it will be evident to one skilled in the art that various changes may be made without departing from the spirit or scope of the invention and it is intended to embrace such changes in the appended claims.

What is claimed is:

1. A vertically sensitive, double coil, self-positioning geophone for a seismic cable comprising a cylindrical housing forming a length of said cable and having bearings at each end thereof, two plates extending parallel to the axis of said housing at diametrically opposed positions each having an aperture therein and a pole piece extending therefrom, bar magnets pivotally mounted on said bearings and maintaining said plates in predetermined spaced-apart relation with said pole pieces extending into said apertures to establish an air gap threaded by a magnetic flux, two coils, means for resiliently mounting said coils in said air gap and in said flux for generation of a voltage upon vibration thereof, and means for gravitationally biasing said magnets to maintain said plates in predetermined relation independently of the rotational position of said housing about the axis of said cable.

2. A vertically sensitive, self-positioning double coil geophone to be included in a seismic cable comprising a cylindrical housing having a bearing in each end thereof, two plates extending parallel to the axis of said housing at diametrically opposed locations each having an aperture adjacent one end and a cylindrical pole piece extending diametrically across said housing from adjacent the other end, bar magnets pivotally mounted from said bearings and maintaining said plates in spaced-apart relation with the pole piece of each said plate extending into the aperture of the other plate with an air gap between the end of said pole piece and the periphery of said aperture, said bar magnets being similarly poled with respect to said plates to produce a magnetic flux in said air gaps, two coils, means for resiliently mounting said coils in said flux, and means for gravitationally biasing said magnets supported by said bearings to maintain said plates in a predetermined orientation upon rotation of said housing about the axis of said cable.

3. A geophone sensitive to vibrations normal to the axis of a cylindrical housing which comprises two plates extending adjacent the walls in said housing and parallel to the axis thereof at diametrically opposed points, each plate having an aperture adjacent one end and a pole piece extending therefrom adjacent the other end, a magnet extending transversely of said housing intermediate said ends of said plates to maintain said plates in predetermined spaced-apart relation with the extension of each plate positioned in the aperture of the other plate with an air gap therebetween, a coil in each air gap, means for resiliently supporting said coils in said air gaps for opposite movement with respect to the flux therein upon vibration of said housing, and circuit means interconnecting said coils for subtraction of the voltages generated upon vibration thereof.

4. An electromagnetic geophone structure comprising a bar magnet, identical pole plates positioned with their centers adjacent the poles of said magnet and extending from said magnet normal to the length thereof, each pole plate having an aperture on one side of said magnet and an extension on the other side of said magnet, the end of the extension of each pole plate being positioned in the aperture of the other pole plate, a coil in each aperture encircling the end of the associated extension, resilient means for vibrationally mounting said coils in said apertures adjacent opposite ends of said magnet whereby voltages of opposite polarity are generated upon vibration of said coils in the flux due to said magnet and of the same polarity upon vibration in the flux due to extraneous fields, and a circuit for connecting said coils for reinforcement of the former and cancellation of the latter voltages.

5. An electromagnetic geophone structure comprising a bar magnet, identical pole plates mounted intermediate their ends at the poles of said magnet and extending from said magnet normal to the length thereof, each pole plate having an aperture on one side of said magnet and an extension on the other side of said magnet, the ends of the extension of each pole plate being positioned in the aperture of the other pole plate, with an air gap therebetween, a coil in each aperture encircling the end of the associated extension, resilient means for vibrationally mounting said coils in said apertures adjacent opposite ends of said magnet, means extending through said extensions and linking said resilient means to assure translational vibration of said coils, whereupon voltages of opposite polarity are generated upon vibration of said coils in the flux due to said magnet and of the same polarity upon vibration in the flux due to extraneous fields, and a circuit for connecting said coils for reinforcement of the former and cancellation of the latter voltages.

6. An electromagnetic geophone structure comprising bar magnets, two plates each having an aperture therein and a pole piece extending therefrom, means for supporting the first of said plates at like poles of said magnets, means for supporting the second of said plates at the opposite poles of said magnets with the pole piece thereon extending into the aperture of the first plate and the pole piece of the first plate extending into the aperture in the second plate with air gap between said aperture and extensions threaded by flux from said magnets, said plates being maintained in predetermined spaced-apart relation by said magnets, two coils, means for resiliently mounting said coils in said air gaps for generation of voltages of opposite polarity upon vibration thereof in said flux and circuit means interconnecting said coils for subtraction of said voltages.

KENNETH W. McLOAD.

REFERENCES CITED

The following references are of record in the file of this patent:

UNITED STATES PATENTS

| Number | Name | Date |
| --- | --- | --- |
| 2,021,330 | Ross | Nov. 19, 1935 |
| 2,067,636 | Heiland | Jan. 12, 1937 |
| 2,269,453 | Gayhart | Jan. 13, 1942 |
| 2,283,200 | Flude | May 19, 1942 |
| 2,296,754 | Wolf et al. | Sept. 22, 1942 |
| 2,390,187 | Sharpe | Dec. 4, 1945 |
| 2,407,697 | Williams | Sept. 17, 1946 |
| 2,410,805 | Black | Nov. 12, 1946 |